United States Patent

Himeno et al.

Patent Number: 5,744,588
Date of Patent: Apr. 28, 1998

[54] BLUE TYPE DISPERSE DYE MIXTURE AND PROCESS FOR ITS PREPARATION

[75] Inventors: Kiyoshi Himeno; Toshio Hihara; Yousuke Takahashi, all of Kitakyushu, Japan

[73] Assignee: DyStar Japan Ltd., Osaka, Japan

[21] Appl. No.: 729,027

[22] Filed: Oct. 9, 1996

[30] Foreign Application Priority Data

Oct. 18, 1995 [JP] Japan ................................. 7-293815

[51] Int. Cl.$^6$ .......................... C09B 67/22; C09B 41/00
[52] U.S. Cl. .................. 534/581; 534/850; 534/DIG. 1; 8/639; 8/922
[58] Field of Search .................. 534/573 M, DIG. 1, 534/581; 8/639

[56] References Cited

U.S. PATENT DOCUMENTS 5,393,308  2/1995  Lange et al. ............................. 8/639

FOREIGN PATENT DOCUMENTS

96/16129  3/1996  WIPO.

Primary Examiner—Fiona T. Powers
Attorney, Agent, or Firm—Oblon, Spivak, McClelland, Maier & Neustadt, P.C.

[57] ABSTRACT

A blue type disperse dye mixture comprising 1.0 part by weight of at least one dye of the formula (1), from 0 to 0.2 part by weight of at least one dye of the formula (2), from 0.05 to 1.0 part by weight of at least one dye of the formula (3) and from 0.05 to 1.0 part by weight of at least one dye of the formula (4):

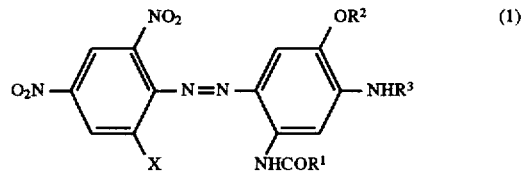

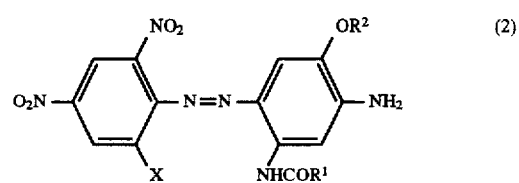

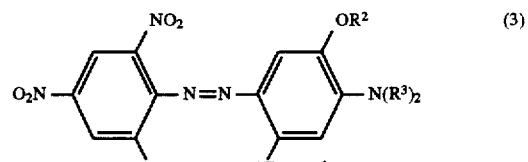

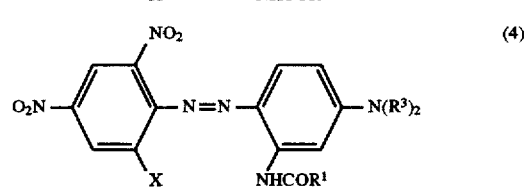

wherein X is a chlorine atom or a bromine atom, $R^1$ is a $C_{1-5}$ alkyl group, $R^2$ is a $C_{1-4}$ alkyl group, and $R^3$ is a $C_{1-5}$ alkyl group or an allyl group, provided that $R^1$, $R^2$ and $R^3$ may, respectively, be the same or different among the formulae (1) to (4).

10 Claims, No Drawings

BLUE TYPE DISPERSE DYE MIXTURE AND PROCESS FOR ITS PREPARATION

BACKGROUND OF THE INVENTION

1. Field of the Invention

The present invention relates to a blue type disperse dye mixture which is excellent in the temperature dependency, pH dependency, light-fastness and build up property and which has a high dyeing speed.

2. Discussion of the Background

Dyes of the following formulae (1) and (2) are excellent in the pH dependency and light-fastness, but its temperature dependency is inadequate, and the build up property is also required to be improved especially in the field of dyeing with a medium to deep color.

Dyes of the following formulae (3) and (4) are excellent in the temperature dependency as compared with the dyes of the formulae (1) and (2), but the build up property is required to be improved in the field of dyeing with a medium to deep color. Further, the dye of the formula (3) is poor also in the light-fastness.

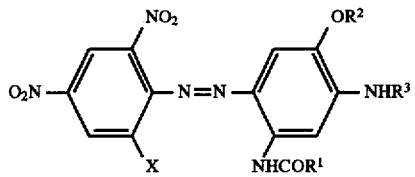

(1)

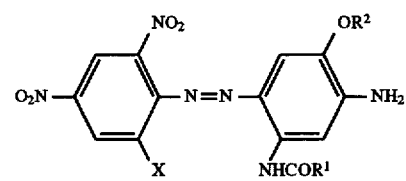

(2)

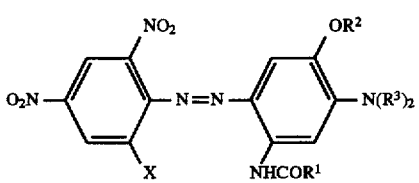

(3)

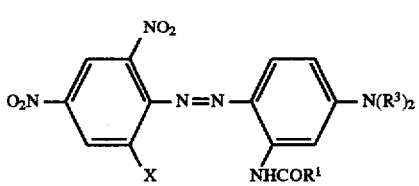

(4)

wherein X is a chlorine atom or a bromine atom, $R^1$ is a $C_{1-5}$ alkyl group, $R^2$ is a $C_{1-4}$ alkyl group, and $R^3$ is a $C_{1-5}$ alkyl group or an allyl group, provided that $R^1$, $R^2$ and $R^3$ may, respectively, be the same or different among the formulae (1) to (4).

As a dye which solves the problems of these dyes, Japanese Unexamined Patent Publication No. 102182/1995 discloses a dye mixture having dyes included in the formulae (1) and (3) blended in a weight ratio of from 95:5 to 5:95. However, with such a dye mixture, the temperature dependency, light-fastness and build up property are not yet adequate, and further the dyeing speed is slow. Accordingly, such a dye mixture is still not suitable for quick dyeing.

SUMMARY OF THE INVENTION

The present inventors have conducted extensive studies with an aim to develop a blue type disperse dye which is excellent in the temperature dependency, pH dependency, light-fastness and build up property and which has a high dyeing speed and as a result, have found it possible to attain the aim by a dye mixture having the dyes of the above formulae (1) to (4) blended in certain specific proportions.

The present invention has been accomplished on the basis of this discovery.

The present invention provides a blue type disperse dye mixture comprising 1.0 part by weight of at least one dye of the formula (1), from 0 to 0.2 part by weight of at least one dye of the formula (2), from 0.05 to 1.0 part by weight of at least one dye of the formula (3) and from 0.05 to 1.0 part by weight of at least one dye of the formula (4).

Further, the present invention provides a process for preparing the blue type disperse dye mixture, which comprises coupling a diazotized product of a 2,4-dinitroaniline derivative of the formula (5) with a mixture comprising predetermined amounts of compounds of the formulae (6), (7), (8) and (9):

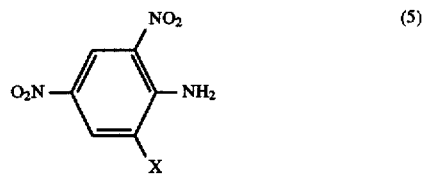

(5)

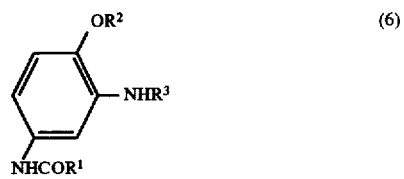

(6)

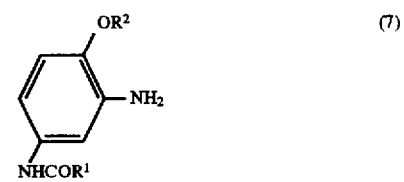

(7)

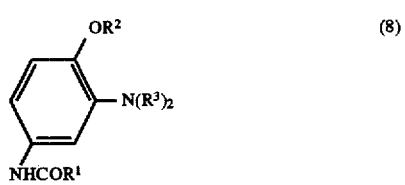

(8)

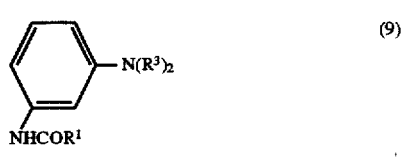

(9)

wherein X, $R^2$ and $R^3$ are as defined above.

DETAILED DESCRIPTION OF THE PREFERRED EMBODIMENTS

The blue type disperse dye mixture of the present invention comprises the dyes of the above formulae (1) to (4) in the above specific proportions. However, better results can be obtained when the proportions are such that, relative to 1.0 part by weight of at least one dye of the formula (1), at least one dye of the formula (2) is from 0.05 to 0.15 part by weight, and at least one dye of each of the formulae (3) and (4) is from 0.05 to 1.0 part by weight, preferably from 0.2 to 0.5 part by weight, more preferably from 0.3 to 0.4 part by weight.

Further, the dyes of the above formulae (1) to (4), wherein X is a chlorine atom, are excellent in the dyeing stability and dyeing property to metal ions, particularly to copper ions, and it is preferred that each of $R^1$ and $R^2$ is a methyl group or an ethyl group, and $R^3$ is a $C_{2-4}$ alkyl group.

The dye mixture of the present invention may be prepared by blending predetermined amounts of the dyes of the above formulae (1) to (4). However, it is possible to obtain a dye mixture of the present invention which is excellent in the build up property and which has a high dyeing speed by diazotizing a 2,4-dinitroaniline derivative of the above formula (5), and then coupling this diazotized product and compounds of the above formulae (6) to (9) as coupling components, simultaneously in the same reaction system in such proportions as to bring about the composition of the desired dye mixture. In some cases, it is also possible to obtain a dye mixture by coupling the above diazotized product with a mixture comprising two or three out of the coupling components of the above formulae (6) to (7), followed by blending other necessary dyes thereto to obtain the dye mixture of the present invention. The blend proportions of the coupling components are suitably selected taking into consideration the respective reaction rates and the desired composition of the dye mixture.

For example, a 2,4-dinitroaniline derivative of the formula (5) may be added to a mixed solution comprising from 1 to 3 times by weight of 95–100% sulfuric acid and from 1.0 to 1.05 (mol ratio) of nitrosyl sulfuric acid, at a temperature of from 15° to 35° C. over a period of from 2 to 8 hours, followed by diazotization with stirring at that temperature for from 1 to 3 hours. On the other hand, predetermined amounts of coupling components of the formulae (6) to (9) were dissolved in from 10 to 50 times by weight of 0.01–0.2 wt % sulfuric acid to obtain a coupling component solution, and then the above diazotized reaction solution is added thereto. The diazotized component is preferably from 1.05 to 1.1 times (in molar ratio) relative to the coupling components. In this reaction, it is expected that the yield to the compounds of the formulae (6) and (9) is about 90%, the coupling yield to the compound of the formula (7) is about 100%, and the coupling yield to the compound of the formula (8) is from about 65 to 75%.

A method for adding the diazo component to the coupling components is preferably such that from 60 to 80 wt % of the diazotization reaction solution is dropwise added over a period of from 1 to 3 hours to a coupling component solution maintained at a temperature of from −1° to 5° C. at a pH of not higher than 1, and then from 40 to 20 wt % of the rest is added over a period of from 1 to 3 hours to the coupling component maintained at a temperature of from −1° to 5° C. and at a pH of 4±0.5 by an addition of e.g. a 25% sodium hydroxide aqueous solution. Further, for the purpose of improving the dispersibility and filtration property, it is preferred to heat the reaction solution to a temperature of from about 80° to 90° C. after completion of the coupling reaction, followed by heat treatment at that temperature for from 1 to 5 hours. The reaction solution after the heat treatment is subjected to filtration, and the filtration residue is washed to obtain a dye cake of the dye mixture of the present invention. If necessary, other blue dyes such as dyes of the following formulae (10) and (11), may be incorporated to the dye mixture of the present invention.

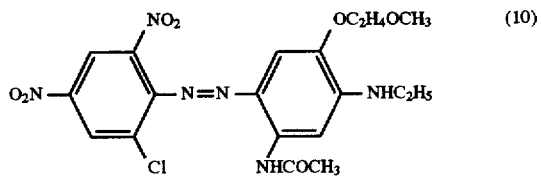

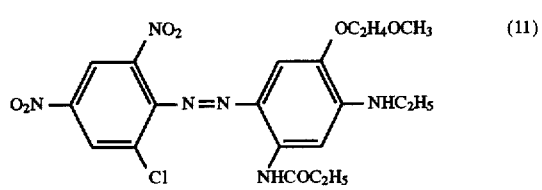

The dye mixture of the present invention is capable of dyeing polyester fibers made of e.g. polyethylene terephthalate, polybutylene terephthalate or a polycondensation product of terephthalic acid with 1,4-bis-(hydroxymethyl)cyclohexane, with a blue color with an excellent leveling property and reproducibility. The object to be dyed may be in the form of yarns, knitted fabrics or woven fabrics made of polyester fibers or a mixed fiber product of the above polyester fibers with other fibers such as cotton, silk, wool, rayon, acetate, polyamide, polyurethane, etc. As a method of dyeing e.g. polyester fibers by means of the dye mixture of the present invention, the dye mixture comprising the dyes of the above formulae (1) to (4), may be dispersed in an aqueous medium by using, as a dispersant, a condensation product of naphthalene sulfonic acid with formaldehyde, a higher alcohol sulfuric acid ester or a higher alkyl benzene sulfonate to obtain a dyeing bath or a printing paste, and the fibers can be dyed by dip dyeing or printing.

When applied to a dip dyeing method, the dyeing mixture of the present invention exhibits particularly excellent build up property and temperature dependency. As the dip dyeing method, a common dyeing method such as a high temperature dyeing method or a thermosol dyeing method, may be used. In such a case, it is possible to obtain better results by an addition of an acidic substance such as formic acid, acetic acid, phosphoric acid or ammonium sulfate to the dyeing bath. The dyeing conditions are not particularly limited. However, it is preferred to adjust the pH of the dyeing bath to a level within a range of from 4 to 8.5, and the dyeing temperature is usually from 120° to 140° C., and the dyeing time is from 30 to 60 minutes. Further, various leveling agents or ultraviolet absorbers may be incorporated.

Now, the present invention will be described in further detail with reference to Examples. However, it should be understood that the present invention is by no means restricted by such specific Examples.

EXAMPLE 1

150 g of a naphthalene sulfonic acid-formalin condensation product and 650 g of water were mixed to a mixture obtained by the method given hereinafter, comprising 27.5 g of a dye of the formula (1—1), 2.5 g of a dye of the formula (2-1), 9.6 g of a dye of the formula (3-1) and 10.4 g of a dye of the formula (4-1) (total amount of dyes: 50 g):

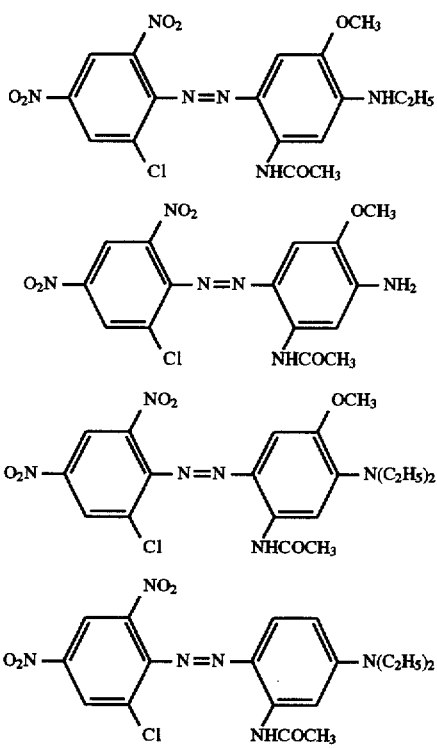

The mixture was subjected to colloid milling by a sand grinder and spray-dried. To each of 0.05 g of and 0.25 g of this powdery dye mixture, 0.08 g of a nonionic leveling agent Diaserver® LP-PSL (manufactured by Mitsubishi Chemical Corporation) and 150 ml of water were added to obtain a dyeing bath, which was adjusted to pH 4.5 with an acetic acid/sodium acetate system. In this dyeing bath, 5 g of a polyester cloth was immersed, and the temperature of the dyeing bath was raised from room temperature at a rate of 2° C./min, an exhaustion dyeing was carried out under three different conditions i.e. at 120° C. for 60 minutes, at 130° C. for 60 minutes, and at 130° C. for 15 minutes, followed by soaping, washing with water and drying to obtain a dye product of a relatively brilliant blue.

With respect to the dyed cloth, the temperature dependency, the build up property, the light-fastness and the dyeing speed were evaluated in accordance with the following methods. The results are shown in Table 1.

Temperature dependency:

The dyeing depth of the dyed cloth which was dyed by using 0.25 g of the dye mixture at 130° C. for 60 minutes, was rated to be 100, and the dyeing depth of the dyed cloth which was dyed by using the same amount of the dye mixture at 120° C. for 60 minutes, was represented by a relative value. The dyeing depth was obtained as a K/S value from the reflectance of the dyed product measured by a color difference meter (Macbeth® Spectrometer, MS-2020, manufactured by Macbeth Company).

Build up property:

The dyeing depth of the dyed cloth which was dyed at 130° C. for 60 minutes by using 0.05 g of the dye mixture, was rated to be 100, and the dyeing depth of the dyed cloth which was dyed under the same conditions by using 0.25 g of the dye mixture, was represented by a relative value.

Light-fastness:

Carbon arc light was irradiated for 20 hours in accordance with JIS L-0842 to the dyed cloth which was dyed at 130° C. for 60 minutes by using 0.05 g of the dye mixture, whereupon the degree of discoloration was evaluated by a blue scale.

Dyeing speed:

The dyeing depth of the dyed cloth which was dyed at 130° C. for 60 minutes by using 0.25 g of the dye mixture, was rated to be 100, and the dyeing depth of the dyed cloth which was dyed at 130° C. for 15 minutes by using the same amount of the dye mixture, was represented by a relative value.

Preparation of the dye mixture

Diazotization reaction

Into a reactor having a capacity of 1 l, 384 g of 98% sulfuric acid and 401.6 g of 43% nitrosyl sulfuric acid were charged and stirred, and 287 g (molar ratio of 1.1 to the coupling components) of 1-chloro-3,5-dinitroaniline was gradually added thereto over a period of 4 hours at a temperature of 25°±5° C., followed by stirring at that temperature for two hours.

Coupling reaction

Into a reactor having a capacity of 30 l, 2.5 l of 0.01 wt % dilute sulfuric acid was charged, and 132.0 g of 3-ethylamino-4-methoxyacetoanilide, 10.2 g of 3-amino-4-methoxyacetoanilide, 63.4 g of 3-(N,N-diethylamino)-4-methoxyacetoanilide and 49.5 g of 3-(N,N-diethylamino) acetoanilide were added thereto with stirring. Further, about 1,600 g of ice was added thereto to bring the liquid temperature to 0°±3° C. While maintaining this temperature, 12.8 g of sulfamic acid and water were added to this liquid to bring the volume to 4.8 l, and 70 wt % of the above diazotization reaction solution was dropwise added thereto over a period of 4 hours.

Then, while maintaining the liquid temperature at a level of 0°±3° C. by adding 65 ml of acetic acid and ice to the coupling reaction solution, a 25% sodium hydroxide aqueous solution was added to adjust the pH of the reaction solution to 4±0.3, and the rest of the diazotization reaction solution was dropwise added thereto over a period of one hour, followed by stirring for 30 minutes. Then, the liquid temperature was raised to 85° C., followed by stirring further for one hour at a temperature of 85°±2° C. The liquid temperature was maintained by an addition of ice, and the pH was maintained by an addition of a 25% sodium hydroxide aqueous solution, as the case requires, and foaming of the reaction solution was suppressed by an addition of n-butanol.

After completion of the reaction, the reaction solution was subjected to filtration, and the filtration residue was washed with warm water of 50° C., to obtain 893.95 g (calculated as dry product: 468.43 g) of a wet cake having a solid content of 52.4%. This cake was analyzed by HPLC whereby the composition was 55 wt % of the dye of the formula (1—1), 5 wt % of the dye of the formula (2–1), 19.2 wt % of the dye of the formula (3–1) and 20.8 wt % of the dye of the formula (4–1).

COMPARATIVE EXAMPLES 1 TO 4

Dyeing was carried out in the same manner as in Example 1 by using 50 g of the dye of the formula (1—1), (3–1) or (4–1) only, or by using a dye comprising 25 g of the dye of the formula (1—1) and 25 g of the dye of the formula (3–1), in Example 1. The results are shown in Table 1.

TABLE 1

|  |  | Dye content (g) | | | | Temperature dependency *1 | Build up property *2 | Light-fastness | Dyeing speed *3 |
|---|---|---|---|---|---|---|---|---|---|
|  |  | (1-1) | (2-1) | (3-1) | (4-1) |  |  |  |  |
| Examples | 1 | 27.5 | 2.5 | 9.6 | 10.4 | 93 | 445 | 5 | 95 |
|  | 2 | 28.3 | 3.1 | 6.5 | 12.1 | 93 | 440 | 5 | 94 |
|  | 3 | 25.5 | 0.5 | 11.4 | 12.6 | 91 | 430 | 5 | 91 |
|  | 4 | 19.2 | 1.2 | 14.7 | 14.9 | 92 | 420 | 4–5 | 90 |
|  | 5 | 30.4 | 0 | 12.7 | 6.9 | 87 | 415 | 5⁻ | 88 |
| Comparative Examples | 1 | 50 | — | — | — | 40 | 300 | 5 | 25 |
|  | 2 | — | — | 50 | — | 65 | 380 | 3–4 | 41 |
|  | 3 | — | — | — | 50 | 75 | 390 | 4 | 58 |
|  | 4 | 25 | — | 25 | — | 60 | 360 | 4 | 40 |

Ideal values *1: 100 *2: 500 *3: 100

EXAMPLES 2 TO 5

Dyeing was carried out in the same manner as in Example 1 except that in Example 1, the contents of the dyes of the formulae (1—1), (2-1), (3-1) and (4-1) were changed as shown in Table 1. The results are shown in Table 1.

EXAMPLES 6 TO 18

Dyeing was carried out in the same manner as in Example 1 by using dye mixtures comprising dyes as identified in Table 2 as the dyes of the formulae (1), (2), (3) and (4). In Examples 8, 13 and 16, the dye contents were the same as in Example 5, and in other Examples, the dye contents were the same as in Example 1 (within an error range of less than 1%). In each Example, the evaluation results of dyed cloths were as follows.

| Temperature dependency | at least 85 |
|---|---|
| Build up property | at least 400 |
| Light-fastness | at least 4 or 5 |
| Dyeing speed | at least 85 |

The dye mixtures of Examples 6 to 17 were products made of dye mixtures which were prepared in accordance with the method in Example 1, and the dye mixture in Example 18 was a product made of a dye mixture which was prepared by producing the dyes of the formulae (1), (2) and (3) simultaneously in accordance with the method in Example 1 and adding the dye of the formula (4) separately produced, thereto.

TABLE 2

| | | Dye (1) | | | | | Dye (2) | | | | Dye (3) | | | | | Dye (4) | | |
|---|---|---|---|---|---|---|---|---|---|---|---|---|---|---|---|---|---|---|
| Example | X | R¹ | R² | R³ | X | R¹ | R² | | X | R¹ | R² | R³ | | X | R¹ | | R³ | |
| 6 | Cl | CH₃ | CH₃ | C₂H₅ | Cl | CH₃ | CH₃ | | Cl | CH₃ | CH₃ | C₂H₅ | | Cl | CH₃ | | C₂H₅ | |
| 7 | Cl | CH₃ | CH₃ | C₂H₅ | Cl | CH₃ | CH₃ | | Cl | CH₃ | C₂H₅ (R²: CH₃/C₂H₅ = 1/1) | C₂H₅ | | Cl | CH₃ | | C₂H₅ (R¹: CH₃/C₂H₅ = 1/1) | |
| 8 | Cl | CH₃ | CH₃ | C₂H₅ | — | — | — | | Cl | C₂H₅ | CH₃ | C₂H₅ | | Cl | CH₃ | | C₂H₅ | |
| 9 | Cl | CH₃ | C₂H₅ | CH₃ | Cl | CH₃ | CH₃ | | Cl | CH₃ | C₂H₅ | CH₃ | | Cl | CH₃ | | C₄H₉ | |
| 10 | Cl | C₂H₅ | CH₃ | C₂H₅ | Cl | C₂H₅ | C₂H₅ | | Cl | C₂H₅ | C₂H₅ | C₂H₅ | | Cl | CH₃ | | C₂H₅ | |
| 11 | Cl | C₄H₉ | C₃H₇ | CH₂CH=CH₂ | Cl | C₄H₉ | C₄H₉ | | Cl | C₄H₉ | C₃H₇ | CH₂CH=CH₂ | | Cl | CH₃ | | C₂H₅ | |
| 12 | Cl | C₄H₉ | CH₃ | CH₃ | Cl | C₃H₇ | C₃H₇ | | Cl | CH₃ | CH₃ | n-C₅H₁₁ | | Cl | CH₃ | | CH₂CH=CH₂ | |
| 13 | Cl | CH₃ | CH₃ | i-C₃H₇ | — | — | — | | Cl | CH₃ | CH₃ | i-C₃H₇ | | Cl | C₂H₅ | | i-C₃H₇ | |
| 14 | Br | CH₃ | CH₃ | C₂H₅ | Br | CH₃ | CH₃ | | Br | CH₃ | C₂H₅ | C₂H₅ | | Br | CH₃ | | C₂H₅ | |
| 15 | Br | C₂H₅ | CH₃ | n-C₄H₉ | Br | CH₃ | CH₃ | | Br | C₂H₅ | CH₃ | n-C₄H₉ | | Br | CH₃ | | C₂H₅ | |
| 16 | Br | CH₃ | CH₃ | CH₂CH=CH₂ | Cl | CH₃ | CH₃ | | Cl | CH₃ | CH₃ | CH₂CH=CH₂ | | Br | CH₃ | | CH₂CH=CH₂ | |
| 17 | Cl | CH₃ | CH₃ | C₂H₅ | Br | CH₃ | CH₃ | | Br | CH₃ | CH₃ | C₂H₅ | | Cl | CH₃ | | C₂H₅ | |
| 18 | Cl | CH₃ | CH₃ X: Cl/Br = 1/1 | C₂H₅ | Cl | CH₃ X: Cl/Br = 1/1 | CH₃ | | Cl | CH₃ | CH₃ X: Cl/Br = 1/1 | C₂H₅ | | Br | CH₃ | | C₂H₅ X: Cl/Br = 1/1 | |

The blue type disperse dye mixture of the present invention is excellent in the temperature dependency, build up property and light-fastness and has a high dyeing speed.

What is claimed is:

1. A blue type disperse dye mixture comprising 1.0 part by weight of at least one dye of the formula (1), from 0.05 to 0.2 part by weight of at least one dye of the formula (2), from 0.05 to 1.0 part by weight of at least one dye of the formula (3) and from 0.05 to 1.0 part by weight of at least one dye of the formula (4):

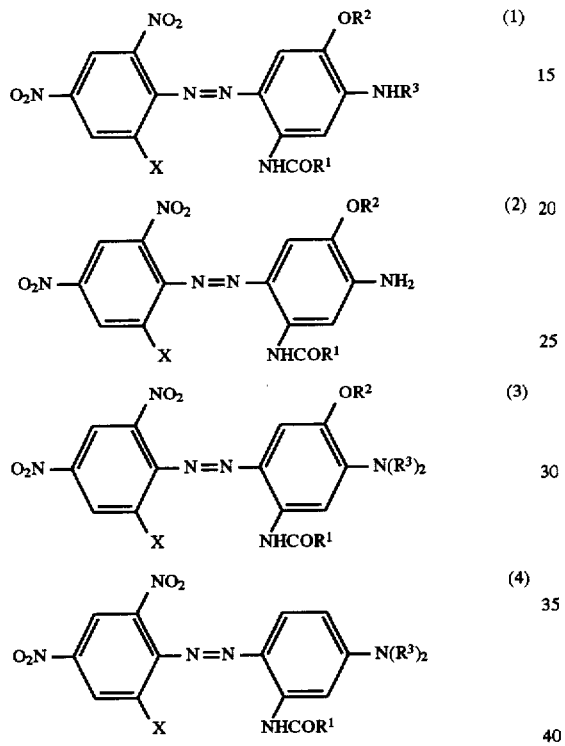

wherein X is a chlorine atom or a bromine atom, $R^1$ is a $C_{1-5}$ alkyl group, $R^2$ is a $C_{1-4}$ alkyl group, and $R^3$ is a $C_{1-5}$ alkyl group or an allyl group, provided that $R^1$, $R^2$ and $R^3$ may, respectively, be the same or different among the formulae (1) to (4).

2. The blue type disperse dye mixture according to claim 1, which comprises 1.0 part by weight of at least one dye of the formula (1), from 0.05 to 0.15 part by weight of at least one dye of the formula (2), from 0.2 to 0.5 part by weight of at least one dye of the formula (3) and from 0.2 to 0.5 part by weight of at least one dye of the formula (4).

3. The blue type disperse dye mixture according to claim 1, wherein in each of the formulae (1) to (4), X is a chlorine atom, each of $R^1$ and $R^2$ is a methyl group or an ethyl group, and $R^3$ is a $C_{2-4}$ alkyl group.

4. The blue type disperse dye mixture according to claim 2, wherein in each of the formulae (1) to (4), X is a chlorine atom, each of $R^1$ and $R^2$ is a methyl group or an ethyl group, and $R^3$ is a $C_{2-4}$ alkyl group.

5. A process for preparing the blue type disperse dye mixture of claim 1, which comprises coupling a diazotized product of a 2,4-dinitroaniline derivative of the formula (5) with a mixture comprising predetermined amounts of compounds of the formulae (6), (7), (8) and (9):

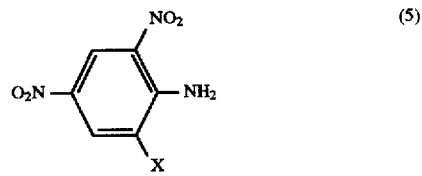

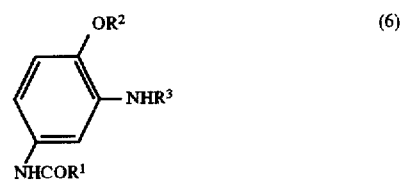

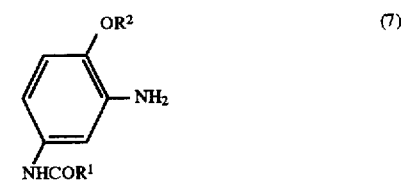

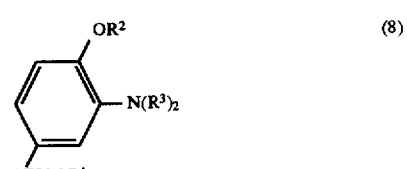

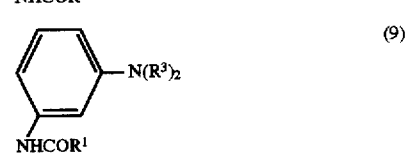

wherein X, $R^2$ and $R^3$ are as defined in claim 1.

6. A blue type disperse dye mixture comprising 1.0 part by weight of at least one dye of the formula (1), from 0 to 0.2 part by weight of at least one dye of the formula (2), from 0.05 to 1.0 part by weight of at least one dye of the formula (3) and from 0.05 to 1.0 part by weight of at least one dye of the formula (4):

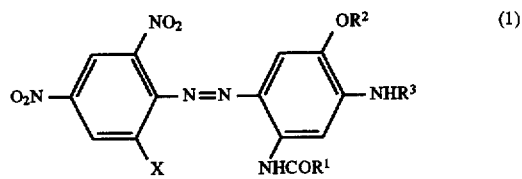

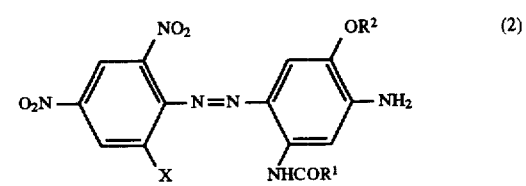

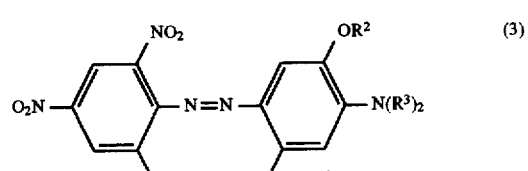

-continued

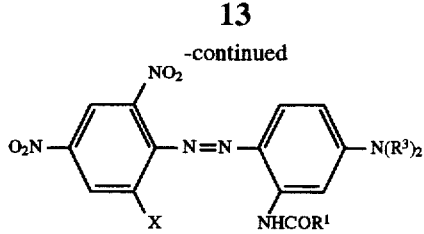
(4)

wherein X is a chlorine atom or a bromine atom, $R^1$ is a $C_{1-5}$ alkyl group, $R^2$ is a $C_{1-4}$ alkyl group, and $R^3$ is a $C_{1-5}$ alkyl group, provided that $R^1$, $R^2$ and $R^3$ may, respectively, be the same or different among the formulae (1) to (4).

7. The blue type disperse dye mixture according to claim 6, which comprises 1.0 part by weight of at least one dye of the formula (1), from 0.05 to 0.15 part by weight of at least one dye of the formula (2), from 0.2 to 0.5 part by weight of at least one dye of the formula (3) and from 0.2 to 0.5 part by weight of at lest one dye of the formula (4).

8. The blue type disperse dye mixture according to claim 6, wherein in each of the formulae (1) to (4), X is a chlorine atom, each of $R^1$ and $R^2$ is a methyl group or an ethyl group, and $R^3$ is a $C_{2-4}$ alkyl group.

9. The blue type disperse dye mixture according to claim 7, wherein in each of the formulae (1) to (4), X is a chlorine atom, each of $R^1$ and $R^2$ is a methyl group or an ethyl group, and $R^3$ is a $C_{2-4}$ alkyl group.

10. A process for preparing the blue type disperse dye mixture of claim 6, which comprises coupling a diazotized product of a 2,4-dinitroaniline derivative of the formula (5) with a mixture comprising predetermined amounts of compounds of the formulae (6), (7), (8) and (9):

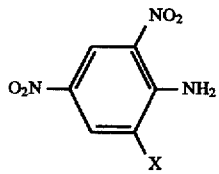
(5)

-continued

(6)

(7)

(8)

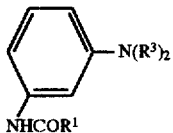
(9)

wherein X, $R^2$ and $R^3$ are as defined in claim 6.

* * * * *